(12) United States Patent
Robertson

(10) Patent No.: US 7,078,102 B2
(45) Date of Patent: Jul. 18, 2006

(54) AQUEOUS COATING COMPOSITION

(75) Inventor: Donald Thomas Robertson, New Lebanon, OH (US)

(73) Assignee: Rohm and Haas Company, Philadelphia, PA (US)

( * ) Notice: Subject to any disclaimer, the term of this patent is extended or adjusted under 35 U.S.C. 154(b) by 86 days.

(21) Appl. No.: 10/079,012

(22) Filed: Feb. 18, 2002

(65) Prior Publication Data

US 2002/0160203 A1 Oct. 31, 2002

Related U.S. Application Data

(60) Provisional application No. 60/270,766, filed on Feb. 22, 2001.

(51) Int. Cl.
*B32B 27/40* (2006.01)

(52) U.S. Cl. .............................. 428/424.2; 428/424.7; 428/424.8; 49/475.1

(58) Field of Classification Search ............. 428/423.1, 428/424.2, 424.8, 424.7; 524/591, 451, 442
See application file for complete search history.

(56) References Cited

U.S. PATENT DOCUMENTS

| | | | |
|---|---|---|---|
| 4,640,212 A * | 2/1987 | Brandt | 114/230.2 |
| 4,676,995 A | 6/1987 | Fabris et al. | |
| 4,720,518 A | 1/1988 | Hihara et al. | |
| 4,789,703 A | 12/1988 | Fabris et al. | |
| 5,110,685 A | 5/1992 | Cross et al. | |
| 5,115,007 A | 5/1992 | Chihara et al. | |
| 5,182,784 A | 1/1993 | Hager et al. | |
| 5,221,707 A | 6/1993 | Chihara et al. | |
| 5,314,752 A | 5/1994 | Bova et al. | |
| 5,342,882 A * | 8/1994 | Gobel et al. | 524/832 |
| 5,476,626 A | 12/1995 | Miyama et al. | |
| 5,558,741 A | 9/1996 | Balcerski et al. | |
| 5,763,011 A | 6/1998 | Miyama et al. | |
| 5,767,188 A | 6/1998 | Kamikuri et al. | |
| 5,969,022 A | 10/1999 | Bova et al. | |
| 6,313,335 B1 * | 11/2001 | Roberts et al. | 556/419 |

FOREIGN PATENT DOCUMENTS

| | | |
|---|---|---|
| CA | 2033530 A1 | 7/1991 |
| EP | 0611095 A1 | 8/1994 |
| EP | 0905174 A2 | 3/1999 |

OTHER PUBLICATIONS

Hawley's Condensed Chemical Dictionary, 13th ed., Richard Lewis, ed., John Wiley & Sons, Inc., New York: 1997, p. 505.*

Derwent Publications, London GD Week 9336, AN 1993-285575, JP 05 202336A (Abstract).

* cited by examiner

*Primary Examiner*—Melanie Bissett

(57) ABSTRACT

An aqueous coating composition including a polyurethane polymer which contains carboxylic acid groups, a crosslinking agent, a wetting agent, a slip aid, and a UV stabilizing agent is provided. Coatings prepared from the aqueous coating composition are durable and have low surface friction, flexibility at low temperatures, and adhesion to low surface energy substrates. A method of preparing a substrate coated with the aqueous coating composition and an article containing the coated substrate are also provided. The aqueous coating composition is useful for providing a protective coating with a low friction surface for automotive weatherstrip.

1 Claim, No Drawings

AQUEOUS COATING COMPOSITION

CROSS REFERENCE TO RELATED APPLICATIONS

This is a non-provisional application of prior pending U.S. provisional application Ser. No. 60/270,766 filed Feb. 22, 2001.

This invention relates to an aqueous coating composition suitable for providing a coating which has a low friction surface. Further, this invention relates to an aqueous coating composition suitable for providing a coating with improved adhesion to low energy surfaces such as untreated ethylene-propylene-diene (EPDM) rubber. More particularly, this invention relates to an aqueous coating composition including a polyurethane polymer, a crosslinking agent, a slip aid, a wetting aid, and a UV inhibitor. Also, this invention relates to a method of applying the aqueous coating composition onto a substrate. Further, this invention relates to an article prepared containing a coating formed from the aqueous coating composition. The aqueous coating composition is useful for providing a protective coating with a low friction surface for automotive weatherstrip.

The present invention provides a coating that has a low friction surface. As used herein, a low friction surface refers to surfaces having a low coefficient of friction. Coatings with low friction surfaces are desirable is many applications including, for example, coatings for weatherstrip used in automobiles. Weatherstrip in automobiles may be used to provide a seal between two components in the body of an automobile. For example, the weatherstrip used to provide a seal between window glass and a door frame typically has a coating with a low friction surface to allow lowering or raising of the window glass with minimum resistance. The coating on the weatherstrip also provides resistance to degradation by abrasion from movement of the window glass. Further, the coating on the weatherstrip must also remain flexible over a wide range of temperatures in order to provide a seal at temperatures of −40° C.

U.S. Pat. No. 5,115,007 discloses a coating composition useful for preparing abrasion-resistant, low friction coatings on EPDM rubber. The disclosed coating composition includes a blocked polyurethane prepolymer containing blocked isocyanates groups, a crosslinking agent coreactive with the blocked isocyanate groups, a compatible silicone oil, and a non-reactive solvent such as toluene. The coating composition is applied to a substrate and then cured to form a coating containing a polyurethane polymer. The coating composition may be applied onto EPDM rubber without prior application of a primer or surface treatment of the EPDM rubber. However, this reference does not disclose an aqueous composition containing a polyurethane polymer.

The use of coating compositions containing organic solvents can result in the release of the organic solvent to the atmosphere and worker exposure to the organic solvent. Aqueous based coating compositions are desired for preparing abrasion-resistant, low friction coatings suitable as coatings for weatherstrip and, further, which may be applied to untreated EPDM rubber.

I have found an aqueous coating composition which provides a abrasion-resistant coating with low surface friction and is suitable for application onto EPDM rubber. Further, this aqueous coating composition may be applied onto untreated EPDM rubber to provide a coating with good adhesion to the untreated EPDM rubber.

In the first aspect of this invention, an aqueous coating composition is provided which includes, based on the weight of the aqueous coating composition: from 10 to 70 weight % of at least one polyurethane polymer, wherein the polyurethane polymer contains at least two carboxylic acid groups; from 1 to 60 weight % of at least one crosslinking agent; from 0.01 to 4 weight % of at least one wetting agent; from 0.1 to 15 weight % of at least one slip aid; and from 0.01 to 20 weight % UV stabilizing agent.

In the second aspect of this invention, a method of preparing a coated substrate is provided including the steps of preparing an aqueous coating composition containing: from 10 to 70 weight % of at least one polyurethane polymer, wherein the polyurethane polymer contains at least two carboxylic acid groups; from 1 to 60 weight % of at least one crosslinking agent; from 0.01 to 4 weight % of at least one wetting agent; from 0.1 to 15 weight % of at least one slip aid; and from 0.01 to 20 weight % UV stabilizing agent; applying the aqueous coating composition to a substrate; drying or allowing to dry the aqueous coating composition to provide a precrosslinked coated substrate; and curing or allowing to cure the precrosslinked coated substrate to provide the coated substrate.

In the third aspect of this invention, an article including a coated substrate containing a substrate and a coating prepared from an aqueous coating composition containing from 10 to 70 weight % of at least one polyurethane polymer, wherein the polyurethane polymer contains at least two carboxylic acid groups; from 1 to 60 weight % of at least one crosslinking agent; from 0.01 to 4 weight % of at least one wetting agent; from 0.1 to 15 weight % of at least one slip aid; and from 0.01 to 20 weight % UV stabilizing agent.

The aqueous coating composition of this invention contains a polyurethane polymer, a crosslinking agent, a wetting agent, a slip aid, and a UV stabilizing agent. The aqueous coating composition may be applied onto untreated EPDM rubber and provides a durable low friction coating.

The polyurethane polymer contained in the aqueous coating composition of the present invention includes aliphatic polyurethane polymers and aromatic polyurethane polymers. The polyurethane polymer contains carboxylic acid groups to provide reactive moieties suitable for reaction with the functional groups of the crosslinking agent. The polyurethane polymer must contain a minimum level of carboxylic acid groups to provide sufficient crosslinking in order to obtain coatings with adequate durability. An excessive level of carboxylic acid groups in the polyurethane polymer may adversely affect the moisture resistance of the coating prepared from the coating composition containing the polyurethane polymer. Polyurethane polymers suitable for the present coating composition may contain levels of carboxylic acid characterized by an acid number in the range of 5 to 50, preferably in the range of 10 to 40, and more preferably in the range of 20 to 40. Further, the polyurethane polymer may have a weight average molecular weight, $M_w$, in the range of 20,000 to above 2,000,000, preferably in the range of 50,000 to above 2,000,000, and more preferably in the range of 100,000 to above 2,000,000. The polyurethane polymer may be in the form of an aqueous dispersion containing polyurethane polymer particles with an average diameter in the range of 20 nm to 1,000 nm, preferably in the range of 30 nm to 500 nm, and more preferably in the range of 40 nm to 300 nm. The aqueous medium containing the polyurethane polymer particles may also contain water miscible organic solvents such as 1-methyl-2-pyrrolidone and methyl ethyl ketone. Preferably, the aqueous dispersion containing the polyurethane polymer does not contain an organic solvent. The aqueous coating composition may contain from 10 to 70 weight %, preferably from 20 to 60 weight %, and more preferably, from 30 to 50 weight % polyurethane polymer, based on the weight of the aqueous coating composition.

The aqueous coating composition of the present invention also contains a crosslinking agent. The crosslinking agent is a polymer or a nonpolymer containing at least two functional groups capable of reacting with the carboxylic acid groups of the polyurethane polymer. Suitable functional groups include epoxides, oxazolines, melamines, carbodiimides, and isocyanates stable in water such as blocked isocyanates. Preferred functional groups are oxazolines and melamines. More preferred are oxazolines as the functional groups. The backbones for polymers with pendant functional groups suitable as the crosslinking agent include acrylates, methacrylates, styrene butadienes, styrene acrylates, and vinyl chlorides. Nonpolymers containing at least two function groups include, for example, phenyl glycidyl ether, melamine monomers, and diepoxide compounds. The crosslinking agent may be a neat solid or liquid, or alternatively may be solubilized or dispersion in an organic solvent or aqueous medium. Preferred crosslinking agents are neat solids or liquids which are soluble or dispersed in water. Other preferred crosslinking agents are aqueous dispersions of polymers with contain oxazoline, epoxide, or blocked isocyanate groups. In one embodiment, the crosslinking agent is an aqueous dispersion of a styrene-acrylic copolymer which contains oxazoline groups. The aqueous coating composition of the present invention contains from 1 to 60 weight %, preferably from 3 to 45 weight %, and more preferably, from 5 to 35 weight % crosslinking agent, based on the weight of the aqueous coating composition.

In the aqueous coating composition of the present invention, the ratio of the number of carboxylic acid groups contained in the polyurethane polymer to the number of functional groups contained in the crosslinking agent may be in the range of 10:1 to 1:10, preferably in the range of 5:1 to 1:5, and more preferably in the range of 3:1 to 1:3.

Another component of the aqueous coating composition is a wetting agent. The wetting agent lowers the surface tension of the aqueous coating composition to increase the ability of the aqueous coating composition to wet the surface of a substrate during application, in particular, substrates with low energy surfaces. As used herein, a wetting agent decreases the surface tension of water by greater than 1 dyne/cm for a 0.01 weight % solution of the wetting agent in water. Suitable wetting agents include silicone surface additives such as polysiloxanes including polyether modified poly-dimethyl-polysiloxane, polyester modified poly-dimethyl-siloxane; fluorosurfactants such as Zonyl™ fluorosurfactants (Zonyl is a trademark of E.I. du Pont de Nemours and Co.); surfactants based on acetylenic alcohol, diol, and glycol chemistry such as Surfynol™ 61 surfactant and Dynol™ 604 surfactant (Surfynol and Dynol are trademarks of Air Products and Chemicals, Inc.) and mixtures thereof. The aqueous coating composition may contain from 0.01 to 4 weight % of the wetting agent, preferably from 0.1 to 4 weight %, more preferably from 0.5 to 4 weight %, based on the weight of the aqueous coating composition.

The aqueous coating composition of this invention also contains 0.1 to 15 weight % of at least one slip aid, based on the weight of the aqueous coating composition. The slip aid may be dispersible or soluble in the water phase of the aqueous coating composition. The slip aid assists in lowering the friction of the surface of the coating prepared from the aqueous composition. As used herein, a surface with low friction has a dynamic coefficient of friction with a value of 3 or lower against glass as measured by ASTM D 1894. The aqueous coating composition preferably provides a coating with a low friction surface. Preferably, the surface of the coating prepared from the aqueous coating composition has a coefficient of friction with a value of 1.5 or lower, more preferably, a coefficient of friction with a value of 1.1 or lower.

Various slip aids are suitable for use in the aqueous coating composition including waxes, silicone additives, fluorinated additives, and mixtures thereof. Suitable waxes include polyethylene waxes, polypropylene waxes, and paraffin waxes. In one embodiment, the aqueous coating composition contains an oxidized polyolefin wax, such as prepared by the process disclosed in U.S. Pat. No. 6,169,148. Suitable silicone additives include polysiloxanes, modified polysiloxanes such as polyether modified poly-dimethyl-polysiloxanes, polyester modified poly-dimethyl-polysiloxanes; hydroxy functional silicones. Suitable fluorinated additives include polytetrafluoroethylene waxes or blends containing polytetrafluoroethylene waxes such as Fluo HT (Micro Powders, Inc.), Aqua Polysilk 19 wax (Micro Powders, Inc.), and Microspersion HT (Micro Powders, Inc.). The waxes, silicone additives, and fluorinated additives may be provided as solutions, dispersions, or emulsions such as anionic wax emulsion, anionic paraffin/polyethylene emulsions or as powders such as polyethylene powder and modified synthetic wax powder. Combinations or mixtures of waxes, silicone additives, and fluorinated additives may be used in order to provide a coating with a low friction surface and other desired properties.

The exterior use of the coating prepared from the aqueous coating composition results in exposure to ultraviolet light (UV), specifically light with a wavelength of less than 380 nm, which may decrease the durability of the coating. To protect the coating prepared from the coating of this invention from inimical UV light, the aqueous coating composition also contains an ultraviolet stabilizing agent, referred to herein as an "UV stabilizing agent". The UV stabilizing agent is a material which is capable of reducing or eliminating the deleterious effects of the of UV light on the coating. The UV stabilizing agent may absorb, scatter, or reflect the UV light. The UV stabilizing agent may be a UV absorbing molecule such as a hindered amine, a substituted hydroxyphenyl benzotriazole, benzotriazole, benzophenone, a substituted acrylonitrile, or a phenol-nickel complex; or a pigment such as carbon black or titanium dioxide. Other suitable pigments include solid bead and microsphere pigments containing voids and vesicles. Examples of solid bead pigments include polystyrene and polyvinyl chloride beads. Examples of microsphere pigments, which include polymer particles containing one or more voids and vesiculated polymer particles are disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; and U.S. Pat. No. 5,510,422. The aqueous coating of this invention may contain from 0.01 to 20 weight % UV stabilizing agent, preferably from 0.02 to 15 weight % UV stabilizing agent, and more preferably, from 0.03 to 10 weight % UV stabilizing agent, based on the weight of the aqueous coating composition.

The aqueous coating composition may optionally contain a pigment. The aqueous coating composition may contain from 0 to 25 weight % pigment, preferably from 0.5 to 15 weight % pigment, and more preferably from 1 to 10 weight % pigment, based on the weight of the aqueous coating composition. Suitable pigments include carbon black; titanium dioxide; iron pigments such as solid iron oxide; antimony oxide pigments; barium pigments; calcium pigment; zirconium pigments; chromium pigments; magnesium pigments; lead pigments; zinc sulfide; lithopone; phthalo blue; phthalo green; metallic pigments such as aluminum; pearlescent pigments; opalescent pigments; iridescent pigments; and plastic pigments such as solid bead and microsphere pigments containing voids and vesicles.

Optionally, a flatting agent may be added to the aqueous coating composition to provide coatings with low levels of gloss. The aqueous coating composition may contain from 0 to 20 weight % flatting agent, preferably from 0.5 to 15 weight % flatting agent, and more preferably from 1 to 10 weight % flatting agent, based on the weight of the aqueous coating composition. Suitable flatting agents include silicas, talcs, ceramics, clays, heavy metal soaps, diatomaceous earth, glass spheres, and mixtures thereof. In one embodiment, the aqueous coating composition contains from 2 to 10 weight % silica flatting agent, based on the weight of the aqueous coating composition.

The aqueous coating composition may optionally contain a catalyst to accelerate the crosslinking reaction between the carboxylic acid groups of the polyurethane polymer and the functional groups of the crosslinking agent. The catalyst may be added to the aqueous coating composition during the mixing step to prepare the aqueous coating composition or may be added to the aqueous coating composition immediately prior to application to a substrate.

The solids level of the aqueous coating composition is typically in the range 20 to 50 weight % solids, based on the weight of the aqueous coating composition. Aqueous coating compositions with higher levels of solids may be prepared, subject to the availability of components with high solids levels and the viscosity required for application. A solids level of less than 20 weight % may also be employed but requires the evaporation of larger amounts of water to dry the aqueous coating composition.

The pH of the aqueous coating composition is typically in the range of 6.5 to 10, preferably in the range of 7 to 9, and more preferably, in the range of 8 to 9, to increase the stability of the polyurethane polymer in the aqueous coating composition and to minimize the crosslinking reaction between the carboxylic acid groups of the polyurethane polymer and the crosslinking agent prior to application. A volatile base may be used to adjust the pH of the aqueous coating composition. Suitable volatile bases include ammonia, lower alkyl amines, triethanolamine, 2-dimethylaminoethanol, N-methylmorpholine, ethylenediamine, and morpholine.

The aqueous coating composition may optionally contain conventional coating adjuvants such as, for example, biocides, coalescents, fillers, rheology modifiers or thickeners, surfactants, buffers, neutralizers, freeze-thaw additives, wet edge aids, humectants, antifoaming agents, dispersants, and anti-oxidants.

The aqueous coating composition may be prepared by combining the various components with mixing. The addition order of the components is not important. During the step of mixing the various components, the pH of the mixture is preferably maintained at or above a value of 6.5. The pH may be adjusted by the addition of acid or base. Preferably, the pH is raised with a volatile base.

Various substrates may be coated with the aqueous coating composition including plastics, elastomers, rubbers, wood, metal, paper, concrete, masonry, concrete, leather, and textiles. The aqueous coating composition is especially suitable for coating elastomeric or rubber substrates such as rubbers including acrylonitrile rubber, butyl rubber, chloroprene rubber, chlorosulfonated polyethylene rubber, ethylene-propylene rubber, ethylene-propylene-diene rubber, halobutyl rubber, halogenated nitrile rubber, isoprene rubber, natural rubber, neoprene rubber, nitrile rubber, polyacrylic rubber; polyurethane elastomers; thermoplastic elastomers such as polyamide block copolymers, polyester block copolymers, polystyrene block copolymers, polyurethane block copolymers, and polypropylene/ethylene-propylene copolymer blends; thermoplastic polyolefins; polysulfides; propylene oxide polymers; epichlorohydrin polymers; and phosphonitrilic fluoroelastomers. Preferably the substrate is selected from chlorosulfonated polyethylene rubber, ethylene-propylene rubber, ethylene-propylene-diene rubber, halogenated nitrile rubber, thermoplastic elastomers, thermoplastic polyolefins, propylene oxide polymers, or epichlorohydrin polymers. Ethylene-propylene-diene rubber is an especially preferred substrate.

A substrate with a low energy surface such as EPDM is typically pretreated with application of a primer coating, exposure to UV light, exposure to a corona discharge, or exposure to plasma to increase the surface energy. The composition of this invention may be applied onto either a substrate with a pretreated surface or a substrate with an untreated low energy surface. In one embodiment, the aqueous coating composition is applied onto a low energy surface that has not been pretreated.

Conventional coating application methods such as, for example, brushing, rolling, drawdown, dipping, curtain coating, and spraying methods such as, for example, air-atomized spray, air assisted spray, airless spray, high volume low pressure spray, and air-assisted airless spray may be used in the method of this invention. Wet coating thickness of the applied aqueous coating composition may range from 5 μm to 150 μm. The aqueous coating composition may be applied onto a substrate as a single coat or multiple coats. Preferably a single coat of the aqueous coating composition is applied. The applied aqueous coating composition may be dried by the application of heat or, alternatively, the applied aqueous coating composition may be allowed to dry. Convective, conductive, and radiative heating methods may be used to dry the wet coating of the aqueous coating composition. Suitable temperatures for drying the applied aqueous coating composition are 10° C. to 120° C. The substrate including the dried coating of the aqueous coating composition, referred to as the "precrosslinked coated substrate", may be cured by heating the precrosslinked coated substrate to provide the coated substrate of this invention. Temperatures suitable for crosslinking include temperatures in the range of 20° C. to 300° C. The heating time for crosslinking may vary with the type of crosslinking agent, the thickness of the coating, and the crosslinking temperature. Typical heating times for crosslinking may range from less than 1 minute to greater than 1 hour. Alternatively, the applied aqueous coating composition may be dried and crosslinked simultaneously.

In one embodiment, the aqueous coating composition is applied onto an elastomeric substrate including EPDM rubber, dried, and crosslinked. The coated elastomeric substrate is useful as weatherstrip on vehicles such as cars and trucks. Other uses for the coated elastomeric substrate include household weatherstrip, industrial weatherstrip, windshield wiper blades, and gaskets for various articles such as luggage.

EXAMPLE 1

Preparation of Aqueous Coating Composition

The aqueous coating composition of this invention was prepared by mixing the materials listed in Table 1.1 while maintaining a pH above 6.5 with the addition of ammonia. The aqueous coating composition had a solids level of 42% and a pH of 8.0.

TABLE 1.1

Composition of Aqueous Coating Composition

| Component | Amount | Material and Supplier |
| --- | --- | --- |
| polyurethane polymer | 61.13 g | Neorez ™ R9409 resin (Neoresins) (32 wt. % solids) |
| deionized water | 5.54 g | |
| flatting agent | 6.00 g | Lo-Vel ™ 2023 silica (PPG) |
| slip aid | 2.32 g | Microspersion HT wax dispersion (Micro Powders, Inc.) (50 wt. % solids) |
| slip aid | 1.93 g | Aqua Polysilk 19 wax (Micro Powders, Inc.) |
| UV stabilizing agent | 2.32 g | Raven Water Black pigment (Columbian Chemicals) |
| crosslinking agent | 16.10 g | Epocros ™ K-2010E polymer (Nippon Shokubai Co, Inc.) |
| slip aid | 3.85 g | Teg Protect ™ 5000 silicone resin (TEGO Chemie) |
| wetting agent | 0.81 g | Byk 333 ™ wetting agent (BYK Chemie) |

EXAMPLE 2

Application and Testing of the Aqueous Coating Composition

The aqueous coating composition of Example 1 was applied to an untreated 15 cm×15 cm molded EPDM rubber substrate by drawdown with a wire wound rod. The wet coating thickness was 75 μm. The samples were dried and cured at 245° C. for 2 minutes to provide the coated substrate of this invention.

The properties of the coated substrate were evaluated according to the following test procedures.

The durability of the coated substrate was evaluated according the toluene double rub test, SP TP 88 (Standard Products). The coated substrate was tested 24 hours after curing. Acceptable durability was a value of 200 or greater cycles.

The cold flexibility of coated substrate was evaluated according to the Ford WSB-M2D49A2 test. The coated substrate was exposed to a temperature of −40° C. for a period of 16 hours. Acceptable cold flexibility properties were the absence of cracks or the loss of adhesion.

The test procedure for determining the coefficient of friction was ASTM D 1894.

The coated substrate prepared from the aqueous coating composition of Example 1 had the following test results:

| | |
| --- | --- |
| Durability Test | 200 cycles |
| Cold Flexibility Test | pass |
| Coefficient of Friction Test | 0.3 |

The test results show that the aqueous coating composition of this invention provides a substrate with durability, acceptable flexibility at low temperature, and a low friction surface, as characterized by a coefficient of friction of less than 3. The aqueous coating composition had good adhesion to untreated EPDM rubber, a low energy surface.

I claim:

1. An article comprising a coated substrate comprising:
   a) a substrate; and
   b) a coating prepared from an aqueous coating composition comprising:
      i) from 10 to 70 weight % of at least one polyurethane polymer, wherein said polyurethane polymer contains at least two carboxylic acid groups; and wherein said polyurethane polymer has an acid number in the range of 5 to 50;
      ii) from 1 to 60 weight % of at least one crosslinking agent;
      iii) from 0.01 to 4 weight % of at least one wetting agent;
      iv) from 0.1 to 15 weight % of at least one slip aid; and
      v) from 0.0.1 to 20 weight % UV stabilizing agent;
   wherein said substrate is selected from the group consisting of chlorosulfonated polyethylene rubber, ethylene-propylene rubber, ethylene-propylene-diene rubber, halogenated nitrile rubber, thermoplastic elastomers, thermoplastic polyolefin elastomers, propylene oxide polymer elastomers, and epichlorohydrin polymer elastomers; and wherein the article is selected from the group consisting of vehicle weatherstrip, household weatherstrip, industrial weatherstrip, windshield wiper blades, and gaskets.

* * * * *